Patented Feb. 18, 1936

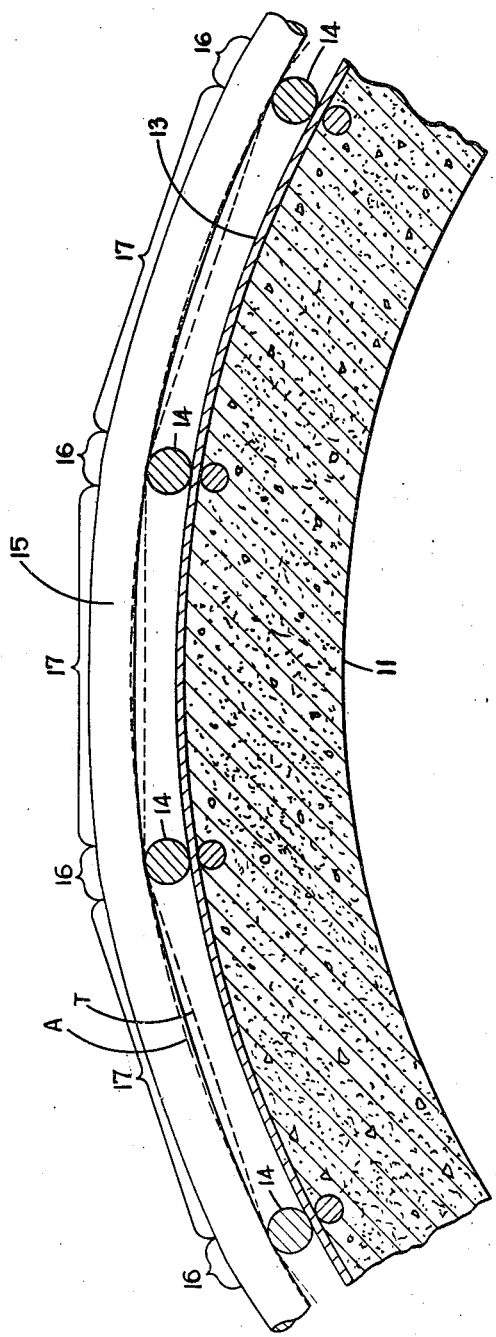

2,031,057

UNITED STATES PATENT OFFICE 2,031,057

COMPOSITE PIPE AND LIKE STRUCTURE

Robert W. Mitchell, Westmount, Quebec, Canada

Application December 24, 1934, Serial No. 759,125

5 Claims. (Cl. 138—84)

This invention relates generally to composite pipes, poles, columns, piles, tanks, caissons and like structures formed of cement concrete or other cementitious material having internal metal reinforcement. In particular, the invention relates to pipes and other structures designed to withstand internal pressure.

For facility of explanation, the invention will be hereinafter described solely in its application to composite pipes, but it will be understood the scope of application of the invention is not thereby limited but extends to all other articles to which it may be applied.

In the manufacture of reinforced concrete pipes, it has been proposed to form the inner portion of the pipe and then to circumferentially reinforce the same usually by winding heavy wire under tension upon the inner portion. Longitudinal reinforcing rods are disposed outwardly of the winding, usually attached thereto, and the whole structure provided with an outer covering of cement concrete. In such structures, especially those in which a fluid tight metal shell is provided immediately within the winding, the bond between the outer concrete covering and the structure within the winding is not as good as is to be desired, especially in pipes designed to withstand high internal pressures. When pipes as just described are subjected to high internal pressures, the inner portion and the circumferential reinforcement expand and, unless preventive measures have been taken, crack or burst the outer concrete covering. In the absence of a good bond between the outer covering and the structure within the reinforcement, the outer covering tends to separate and fall away, thus exposing the reinforcement to corrosion and greatly reducing the life of the pipe. To prevent the separation and falling away of the concrete covering, it has been proposed to embed supplementary reinforcing therein spaced outwardly from the circumferential and longitudinal reinforcing. This practice increases the weight of metal in the pipe, and therefore the cost, without adding to the strength.

The primary object of the present invention is to prevent the separation and falling away of the outer concrete or cementitious covering of composite structures as above described without the use of additional reinforcing and without detracting from the strength of the structure. A further object is to provide a structure which may be manufactured more easily and at lower cost than structures as hereinbefore described. Various other objects and the advantages of the invention may be ascertained from the following description.

According to this invention, longitudinal reinforcing rods are placed outside of and in contact with a preformed inner portion of the structure and circumferential reinforcing is provided outside of and in contact with longitudinal reinforcing, said circumferential reinforcing being under tension such that the reinforcing wire extending between adjacent longitudinal reinforcing members is disposed inwardly of a position parallel with the curved surface of the inner part of the structure (which it would occupy in absence of material tension) and at the same time outwardly of a straight line drawn between the outer portions of adjacent longitudinal reinforcing members.

In the accompanying drawings which illustrate application of the invention to a reinforced concrete pipe or the like:—

Fig. 3 is a fragmentary cross-sectional view, on an enlarged scale, as compared with Figures 1 and 2, illustrating the form of the circumferential reinforcement and its relation to other parts of the structure.

Figure 1:
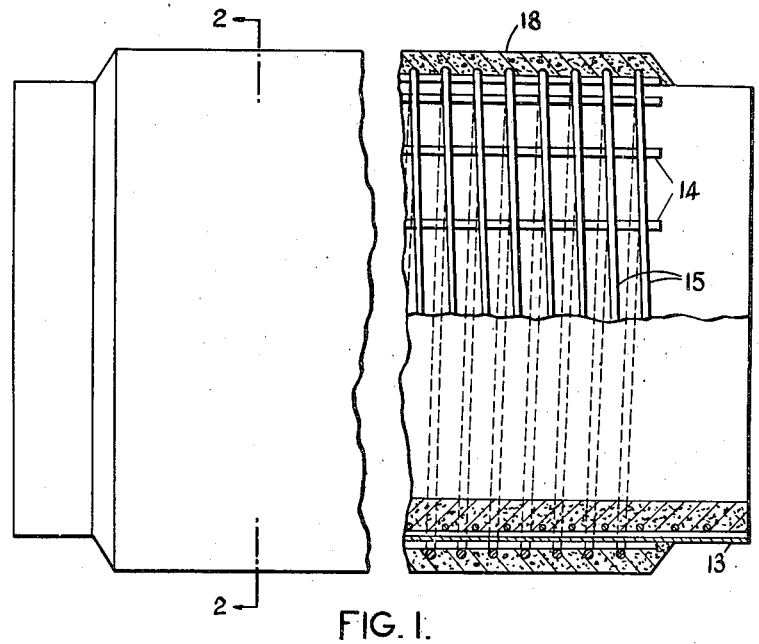
Fig. 1 is an elevation of a length of pipe, partly in longitudinal section, and showing a portion of the covering broken away to expose the reinforcement.
Figure 2:
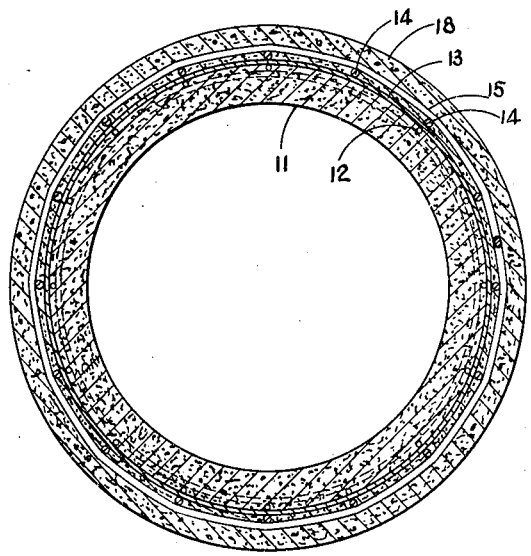
Fig. 2 is a cross-sectional view on the line 2—2 of Figure 1.

Referring more particularly to the drawings, 11 designates the inner portion of a pipe which may include embedded reinforcement 12 and an external fluid tight metal shell 13.

Reinforcing rods or bars 14, preferably circular in cross section, are disposed longitudinally of the inner portion 11 in contact with the outer surface thereof. The diameter, number and spacing of the bars 14 will depend primarily upon the longitudinal or girder strength required in the finished pipe. At the same time, the diameter and spacing of the bars must be such, with reference to the outer surface curvature of the pipe portion 11, that a straight line, designated T in Figure 3, drawn between the outer portions of adjacent bars 14 will be spaced outwardly of the outer surface of the pipe portion 11.

Circumferential reinforcement 15 is disposed outside of and in contact with the longitudinal reinforcement. The circumferential reinforcement is preferably a single wire wound helically, under tension, with the helices spaced apart several times the diameter of the wire, but may be a plurality of wires wound in parallel or a series of separate hoops or bands. The circumferential reinforcing is tensioned to such extent that it is drawn inwardly from the curve or arc, designated A in Figure 3, parallel with the outer surface of the portion 11, which it would occupy in the absence of material tension, but lies outside the straight line T, Figure 3. As result of the tension, each turn of the circumferential reinforcing comprises a series of alternated curved portions 16 and 17 described by radii of materially different lengths. The portions 16, which are centered upon the longitudinal rods, have curvatures described by relatively short radii, the lengths of which, however, are several times the diameter of the rods 14 and much shorter than the radii describing the curvature of the intervening portions 17. The curvature of the portions 17 is described by radii materially greater than, preferably about twice, the radius of outer surface curvature of the pipe portion 11. In other words, the circumferential reinforcement is tensioned to such extent that the wire constituting it is bent over the longitudinal bars in curves, the radii of which are greater than the diameter of the bars and materially less than the radius of surface curvature of the pipe portion 11 and between the bends is drawn somewhat inwardly from parallelism with the outer surface of the pipe portion 11 but is not drawn to straight line between the bars 14.

Using steel wire of diameter and carbon content suitable for the purpose and winding the same while cold, the tension required to bend and position the wire as described is considerable and results in developing the tensile strength of the crcumferential reinforcing sufficiently to prevent straining or fracture of the enveloped structure when subjected to very substantial internal pressure.

It will be seen the several turns or helices of the circumferential reinforcing are spaced from each other and from the outer surface of the pipe portion 11, so that the outer concrete covering 18 extends inside the circle of the circumferential reinforcing and is thereby securely bonded to the reinforcing and to the inner portion 11 of the pipe. It is desirable that the tension in the circumferential reinforcing be as little as is consistent with adequate development of the tensile strength thereof, as the greater the tension the nearer the wire draws to the surface of the portion 11 between the rods and, therefore, the less is the thickness of concrete between the wire and part 11 and the weaker is the bonding.

A convenient method of manufacturing pipe and the like according to this invention is to temporarily secure the longitudinal rods 14 to the exterior of a preformed inner pipe portion 11, attach one end of a wire to one end of the portion 11 and then rotate the portion about its axis while guiding and tensioning the wire, so that it winds in a helix. When the winding is complete, the wire is secured to the other end of the pipe portion 11 to maintain the tension. The outer covering of concrete or the like is applied by plastering the same on or by placing the wound structure 11 in a mould and filling the annular space between it and the mould with concrete, care being taken in either case to ensure that the concrete engages all exposed outer surface of the portion 11 and completely envelops the circumferential reinforcement.

It will be seen that the reinforcement provided according to this invention not only reinforces the inner structure 11 against bursting but also secures the outer cementitious covering in place without additional reinforcing. It will further be seen that a pipe or the like constructed according to this invention may be manufactured very easily and inexpensively as the location of the circumferential reinforcement outside the longitudinal reinforcement secures the latter in position and avoids the formerly necessary expenditure of labour and material in securing external longitudinal reinforcing to internal circumferential reinforcing.

While the curvatures of the circumferential reinforcing have been described and will be hereinafter claimed on the basis of a structure of circular cross-section, as is most usual, it will be understood the invention is not limited to structures of circular cross-section but extends to structures of other cross-section in which the same effect may be obtained.

Having thus described my invention, what I claim is:—

1. A composite pipe or the like comprising a preformed inner portion, longitudinal reinforcing bars outside of and in contact with the outer surface of said inner portion, circumferential reinforcement comprising a continuous member encircling said preformed portion and disposed in tension outside of and in contact with said longitudinal reinforcing but out of contact with said preformed portion, and a cementitious covering for all said reinforcing extending between the circumferential reinforcing and the outer surface of said preformed inner portion and thereby held against displacement.

2. A composite pipe or the like comprising a preformed inner portion, longitudinal reinforcing bars outside of and in contact with the outer surface of said inner portion, circumferential reinforcement comprising a continuous member encircling said preformed portion and disposed in tension outside of and in contact with said longitudinal reinforcing but out of contact with said preformed portion, and a cementitious covering for all said reinforcing extending between the circumferential reinforcing and the outer surface of said preformed inner portion and thereby held against displacement, said circumferential reinforcement comprising alternated portions of different curvatures.

3. A composite pipe or the like comprising a preformed inner portion, longitudinal reinforcing bars outside of and in contact with the outer surface of said inner portion, circumferential reinforcement comprising a continuous member encircling said preformed portion and disposed in tension outside of and in contact with said longitudinal reinforcing but out of contact with said preformed portion, and a cementitious covering for all said reinforcing extending between the circumferential reinforcing and the outer surface of said preformed inner portion and thereby held against displacement, said circumferential reinforcement comprising spaced curved portions, the curvature of which is described by radii of less length than the radius of said preformed pipe portion and comprising further curved portions alternated with said first curved portions, the curvature of said second portions being described by radii of greater length than the radius of said preformed pipe portion.

4. A composite pipe or the like comprising a preformed inner portion, longitudinal reinforcing bars outside of and in contact with the outer surface of said inner portion, circumferential reinforcement comprising a continuous member encircling said preformed portion and disposed in tension outside of and in contact with said longitudinal reinforcing but out of contact with said preformed portion, and a cementitious covering for all said reinforcing extending between the circumferential reinforcing and the outer surface of said preformed inner portion and thereby held against displacement, said circumferential reinforcement comprising spaced curved portions disposed symmetrically of the longitudinal bars and having curvature described by radii of length greater than the diameter of said bars and further curved portions alternated with said first curved portions, the curvature of said second curved portions being described by radii of length greater than the radius of said preformed inner pipe portion.

5. A composite pipe or the like comprising a preformed inner portion including an outer fluid tight metal shell and an inner cementitious body, longitudinal reinforcing bars outside of and in contact with said shell, circumferential reinforcement comprising a continuous member encircling said preformed portion and disposed in tension outside of and in contact with said longitudinal reinforcement but out of contact with said shell, and a cementitious covering for said reinforcements and for the metal shell extending into and filling the spaces between the circumferential reinforcement and the metal shell and thereby held against displacement.

ROBERT W. MITCHELL.